United States Patent
van de Ven

[11] Patent Number: 6,046,846
[45] Date of Patent: Apr. 4, 2000

[54] IMAGE PROJECTION SCREEN HAVING DIFFUSER TO SPREAD LIGHT

[75] Inventor: Johannes C. van de Ven, Eindhoven, Netherlands

[73] Assignee: U.S. Philips Corporation, New York, N.Y.

[21] Appl. No.: 09/159,289

[22] Filed: Sep. 23, 1998

[30] Foreign Application Priority Data

Sep. 26, 1997 [EP] European Pat. Off. .............. 97202964

[51] Int. Cl.⁷ .................................................. G03B 21/60
[52] U.S. Cl. ............................................ 359/455; 359/457
[58] Field of Search ..................... 359/443, 455, 359/456, 457, 460

[56] References Cited

U.S. PATENT DOCUMENTS

| | | | |
|---|---|---|---|
| 2,338,654 | 1/1944 | Mac Neille | 88/28.93 |
| 2,618,198 | 11/1952 | Luboshez | 359/456 |
| 3,791,712 | 2/1974 | Miyagi | 350/128 |
| 3,830,556 | 8/1974 | Bratkowski | 350/128 |
| 4,078,854 | 3/1978 | Yano | 350/128 |
| 5,196,960 | 3/1993 | Matsuzaki et al. | 359/453 |
| 5,611,611 | 3/1997 | Ogino et al. | 353/74 |
| 5,615,045 | 3/1997 | Takuma et al. | 359/456 |
| 5,870,224 | 2/1999 | Saitoh et al. | 359/456 |
| 5,880,887 | 3/1999 | Goto | 359/626 |

*Primary Examiner*—Safet Metjahic
*Assistant Examiner*—Christopher E. Mahoney
*Attorney, Agent, or Firm*—F. Brice Faller

[57] ABSTRACT

A single plate (3) is provided with a first lens structure (7) of longitudinal lenses (9) on one side. A pattern of strips (15) of a light-absorbing material is provided on the other side. The strips (15) extend parallel to the longitudinal lenses (9) in the horizontal direction when the screen is in use. The screen includes a second lens structure (19) and a diffuser on the side with the strip pattern. This vertical lens structure (19) ensures the spread of light in the horizontal direction, while the diffuser ensures the spread of light in the vertical and horizontal directions. The lenses (21) of the second lens structure (19) have a very much larger power than those of the first, horizontal lens structure (7).

11 Claims, 2 Drawing Sheets

IMAGE PROJECTION SCREEN HAVING DIFFUSER TO SPREAD LIGHT

BACKGROUND OF THE INVENTION

The invention relates to an image projection screen comprising a single plate which is provided on one side with a first lens structure of longitudinal lenses and on the other side with a pattern of strips of a light-absorbing material, which lines extend parallel to the longitudinal lenses, and further comprising diffusing means.

An image projection screen of the type described in the opening paragraph is known from, for example U.S. Pat. No. 5,196,960. In the projection screen Flax described in this document, the longitudinal lenses and the strips of light-absorbing material are oriented vertically. The lenses have two functions. On the one hand, they ensure a spread of the signal light in the horizontal direction and, on the other hand, they concentrate the incident signal light on the strips of the screen which are free from light-absorbing material. The horizontal spread function implies that the lenses should have a relatively large power because the horizontal viewing field is relatively wide (generally approximately 45°), which means that the screen plate must be relatively thin. When, moreover, a relatively high resolution is desired, the screen plate will become so thin that this is at the expense of the stability of the screen. To obtain sufficient stability in that case, use is often made of two plates between which the relevant screen is provided. This has the drawback that more surfaces are created on which troublesome reflections may occur.

SUMMARY OF THE INVENTION

It is an object of the invention to provide an image projection screen having a relatively high resolution, which screen is also mechanically stable and has a relatively large horizontal viewing angle.

To this end, the longitudinal lenses and the strips are oriented horizontally when the screen is in use, a second lens structure ensuring a spread of light in the horizontal direction is situated on the side with the strip pattern, and the diffusing means ensure a spread of light in the vertical and horizontal directions, the lenses of the second lens structure having a very much larger power than the lenses of those of the first, horizontal lens structure.

In this case, the first lens structure's only function is to concentrate the signal light between the light-absorbing strips. Consequently, it is sufficient to use lenses having a very small power. This means that the lens structure may have a relatively small pitch, while the screen plate still has a sufficient thickness to ensure stability of the screen, so that a screen having a relatively high resolution can be realized.

A further advantage is that the strip pattern is embedded in the screen. The risk of damage, inter alia when cleaning the screen, is thereby reduced considerably.

The spread of light in the horizontal direction is effected by the second lens structure on the screen side facing the viewer, in combination with the diffuser which also ensures the vertical line spread.

As noted in U.S. Pat. No. 5,196,960 Moiré interference is suppressed by another extra light-diffusing layer in the proximity of the exit surface of the screen. In the screen according to the invention, the first lens structure of the screen has considerably smaller dimensions than the pixels in the projected state, so that Moiré interference is prevented. In this way, the extra layer, which causes additional diffusion and thus gives rise to a reduction of the brightness and the resolution of the screen, can be dispensed with.

An embodiment of the image projection screen according to the invention is characterized in that the diffusing means and the second lens structure are implemented as a lens structure whose lenses comprise a diffusing material.

A further embodiment of the image projection screen according to the invention is characterized in that the image projection screen is provided with a Fresnel lens on the side of the first lens structure.

A further embodiment of the image projection screen according to the invention is characterized in that the diffusing means are spread across the second lens structure and a separate layer which is separated from the second lens structure.

By distributing the diffuser across two separate layers, the coherence of the projection beam is eliminated and speckle can be reduced considerably, while a high resolution is maintained.

These and other aspects of the invention are apparent from and will be elucidated with reference to the embodiments described hereinafter.

DETAILED DESCRIPTION OF THE PREFERRED EMBODIMENTS

Figure 1:
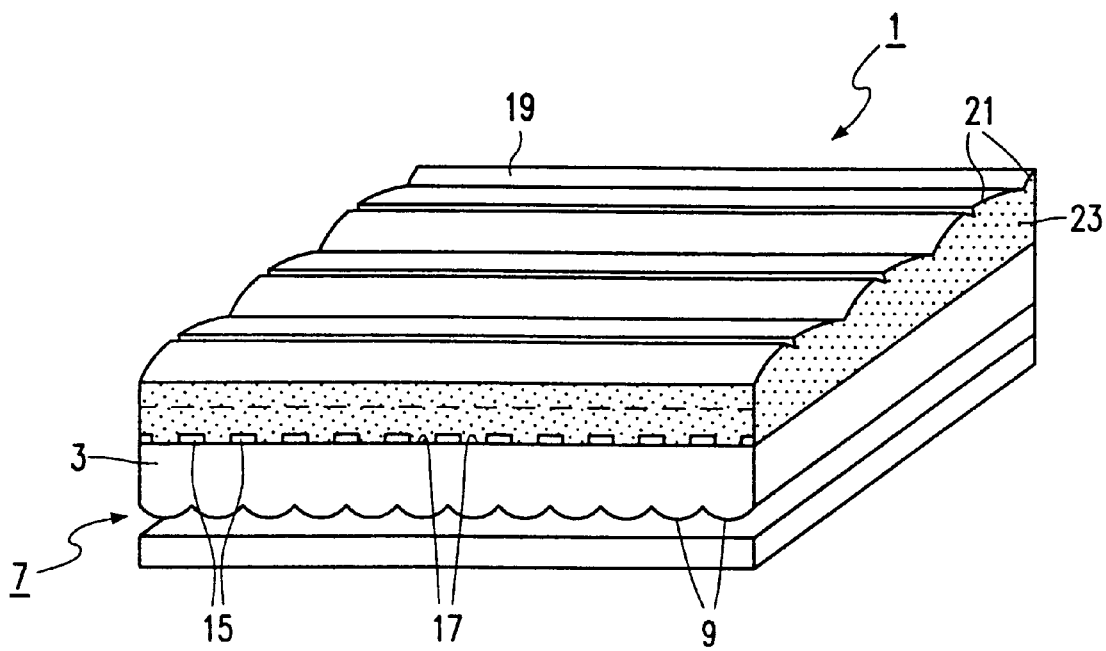
FIG. 1 shows a first embodiment of an image projection screen according to the invention.

The image projection screen 1 shown in FIG. 1 comprises a single plate 3 which functions as the substrate. On one side, the side on which the signal light is incident, the plate is provided with a first, longitudinal lens structure 7. The lenses 9 extend in the horizontal direction when the screen is in use. A pattern of strips 15 of a light-absorbing material is present on the opposite side of the plate 3. This pattern ensures that ambient light is suppressed so that the image contrast is enhanced. The lines strips extend parallel to the lenses 9. The lenses ensure that the light to be projected and being incident on the screen 1 is concentrated in the optically active areas 17 between the strips 15. In this way, the smallest possible quantity of signal light is absorbed.

A second lens structure 19 is provided on top of the pattern of light-absorbing strips 15. The longitudinal lenses 21 of this lens structure 19 extend in the vertical direction and ensure the horizontal light spread. The lenses 21 have convex longitudinal surfaces which face away from the optically active areas 17. The second lens structure 19 is a TIR (total internal reflection) structure. This means that the lenses 21 have relatively steep side walls which internally reflect incident light totally towards the top portion of the lenses. These lenses 21 have a very much larger power than the lenses 9 of the first lens structure 7. In this way, a relatively large viewing angle can be realized in the horizontal direction. The second lens structure 19 also ensures the formation of the image.

The lenses of the first lens structure 7 have a diameter d of, for example, 0.25 mm and a focal length f of 2 to 3 mm, which means that the ration f/d will be between 8 and 12. The second lens structure 14, which operates on the basis of total internal reflection, is to realize a horizontal viewing angle of approximately 45°. This means that the ratio f/d is approximately 0.5.

Figure 2:
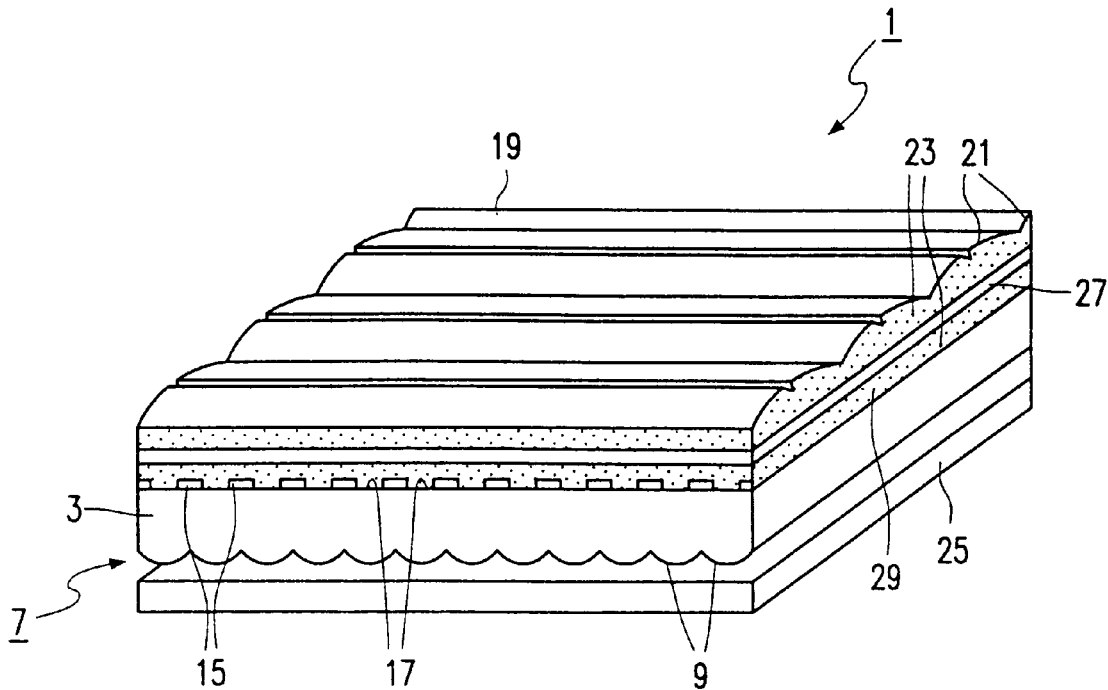
FIG. 2 shows a second embodiment of an image projection screen according to the invention.

The screen also comprises a diffuser 23. This diffuser 23 ensures light spread in the vertical direction and homogenizes the light spread in the horizontal direction, realized by the second lens structure. The diffuser 23 may be implemented in different ways. It may be implemented as a lens structure of a diffuse lacquer which is directly provided on the plate 3. An embodiment is shown in FIG. 1. The diffuse lacquer layer with the lens structure may be alternatively provided on one side of a thin optically transparent plate 27, the other side of which is also provided with a diffuse lacquer layer 29, but without a lens structure. An embodiment thereof is shown in FIG. 2. An advantage of the latter embodiment is that the light incident on the screen will pass two diffusing layers so that the speckle is reduced considerably. Speckle often occurs in systems with screens which comprise a diffuser in combination with high magnifications in which the beam has a large coherence. A solution to the reduction of speckle can be chosen for a relatively thick diffusing layer, However, the resolution will then decrease again. By using two separate, relatively thin diffusing layers, the coherence of the beam will be eliminated. In this way, a screen having a reduced speckle is realized, without affecting the resolution.

Another possibility is to roughen the surface of the second lens structure instead of using a diffuse lacquer. This possibility may also be combined with a separate diffuse lacquer layer between the roughened surface and the substrate, so that two separate diffusing areas are formed again. Moreover, on the side of the first lens structure 7, the screen may be provided with a Fresnel lens 25 which ensures that the signal light is incident as a collimated beam on the screen.

Figure 3:
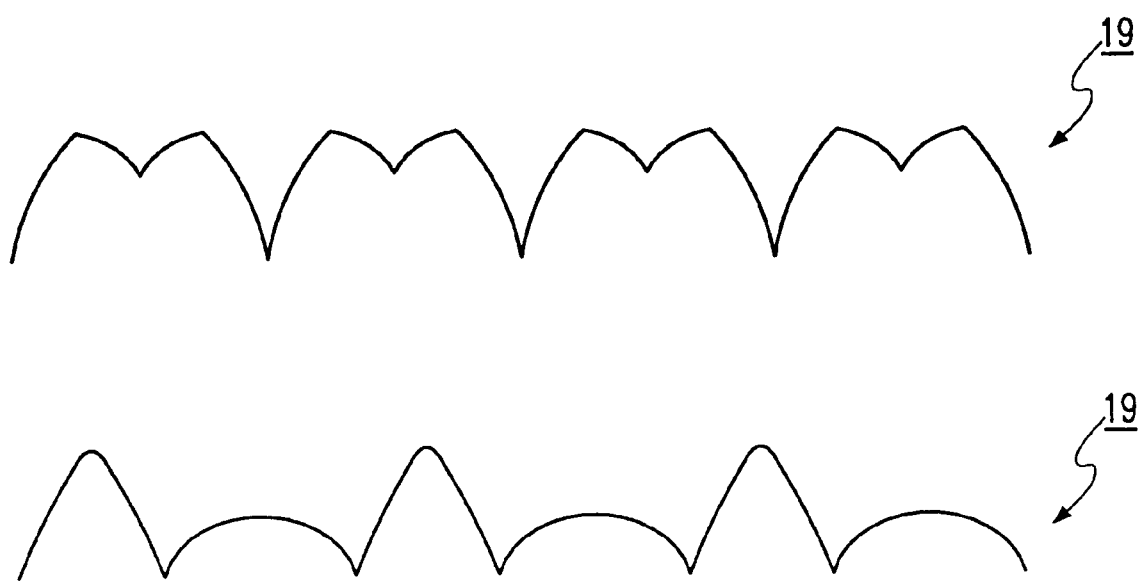
FIG. 3 shows some possible shapes of the lenses of the second lens structure.

Finally, FIG. 3 shows some more embodiments of TIR structures of the second lens structure.

What is claimed is:

1. An image projection screen comprising a substrate having a light receiving side with a first lens structure of longitudinal lenses aligned in a horizontal direction and an opposed side with a pattern of strips of a light-absorbing material which extend parallel to the longitudinal lenses, said lenses concentrating light in optically active areas between the strips, and a second lens structure of longitudinal lenses aligned in a vertical direction which receives light from the optically active areas and spreads light in a horizontal direction, and further comprising diffusing means which ensure a spread of light in the vertical and horizontal directions, the lenses of the second lens structure having a larger power than the lenses of the first, horizontal lens structure.

2. An image projection screen as claimed in claim 1 wherein the diffusing means and the second lens structure are implemented as a lens structure whose lenses comprise a diffusing material.

3. An image projection screen as claimed in claim 1 wherein the image projection screen further comprises a Fresnel lens on the light receiving side of the first lens structure.

4. An image projection screen as claimed in claim 1 wherein the diffusing means are incorporated in the second lens structure.

5. An image projection screen as in claim 4 wherein said diffusing means further comprise a separate layer which is separate from the second lens structure.

6. An image projection screen as in claim 1 wherein the lenses of the second lens structure have a ratio f/d of approximately 0.5.

7. An image projection screen as in claim 6 wherein the lenses of the first lens structure have a ratio f/d of between 8 and 12.

8. An image projection screen as in claim 1 wherein the lenses of the second lens structure comprise convex longitudinal surfaces which face away from the optically active areas.

9. An image projection screen as in claim 8 wherein said convex longitudinal surfaces are formed on a material which is provided directly on the opposed side of the substrate.

10. An image projection screen as in claim 9 wherein said material is a light diffusing material which constitutes said diffusing means.

11. An image projection screen as in claim 1 wherein the first and second lens structures are formed on opposite sides of a single composite block.

* * * * *